Oct. 23, 1951  N. G. SCHUESSLER  2,572,526
PORTABLE ARMREST FOR AUTOMOBILES
Filed April 14, 1950
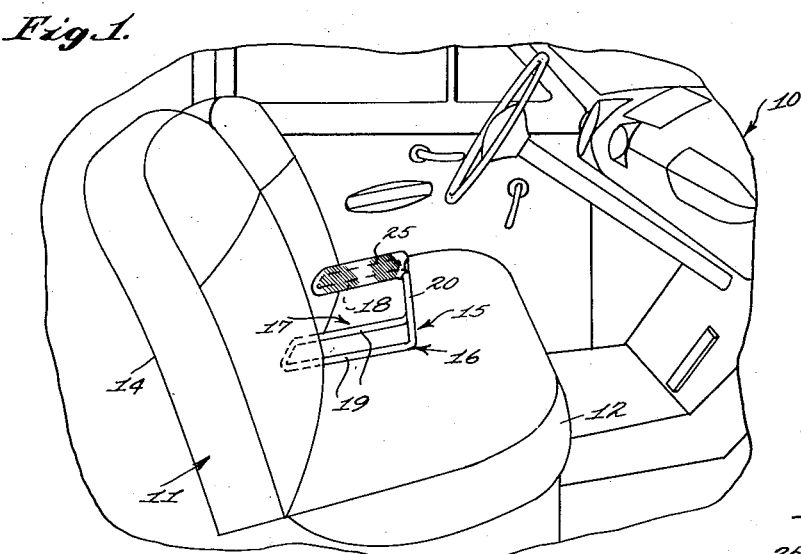
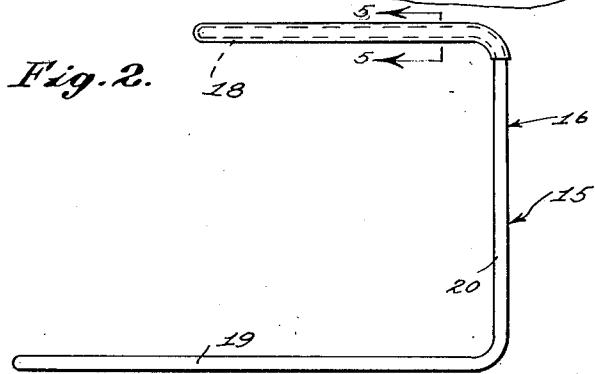
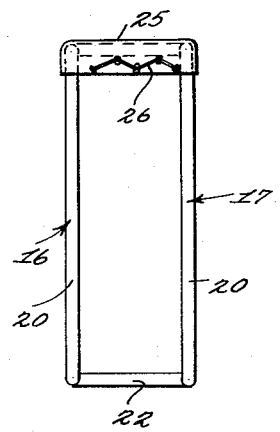
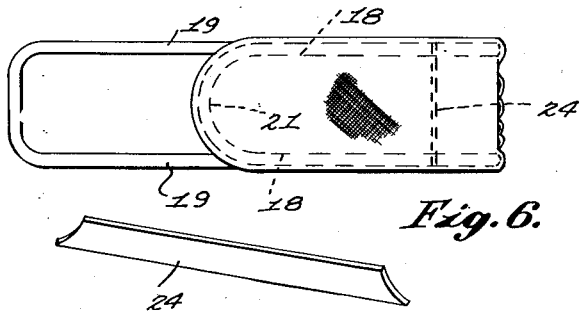
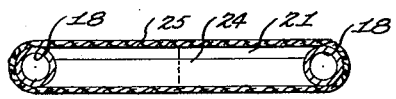
INVENTOR.
NORMAN G. SCHUESSLER
BY
McMorrow, Berman & Davidson
ATTORNEYS Patented Oct. 23, 1951

2,572,526

UNITED STATES PATENT OFFICE 2,572,526

PORTABLE ARMREST FOR AUTOMOBILES

Norman G. Schuessler, San Angelo, Tex.

Application April 14, 1950, Serial No. 155,903

3 Claims. (Cl. 155—112)

This invention relates to a portable arm rest for automobiles, and more particularly to an arm rest for the right arm of a driver, which arm rest may be removed, adjusted and positioned when and as desired by the driver of the vehicle to conform to his own particular requirements and desires.

It is an object of this invention to provide an arm rest of the kind to be more particularly described hereinafter to serve as an arm rest for the right arms of the drivers of cars and trucks to eliminate the fatigue occasioned by long drives, and furnishes added comfort to passengers on both the front and rear seats of the vehicle.

Another object of this invention is to provide a portable arm rest of this kind which may be used to eliminate much of the one-hand driving on long and tiresome drives, and provides an ideal arm rest and support for a mother holding a sleeping child while riding in the car, thus eliminating some of the fatigue and arm strain. The portable arm rest also provides for the needed support of the mother while feeding a child in transit in a vehicle having a portable arm rest of this kind.

With the above and other objects in view, my invention consists in the arrangement, combination and details of construction disclosed in the drawings and specification, and then more particularly pointed out in the appended claims.

In the drawings:

Figure 1 is a perspective view of a portable arm rest constructed according to an embodiment of my invention engaged in a selected position between the seat and back of a vehicle car seat;

Figure 2 is a side elevation of the portable arm rest removed from its engagement with the seat of a vehicle;

Figure 3 is a front elevation of the arm rest;

Figure 4 is a top plan view thereof;

Figure 5 is a transverse section taken on the line 5—5 of Figure 2;

Figure 6 is a perspective view of the flat brace element removed from its assembly with the portable arm rest.

Referring to the drawings, the numeral 10 designates generally a vehicle having a seat 11 formed with a seat cushion 12 and a seat back 14 mounted in a substantially conventional manner, wherein the lower edge of the seat back 14 is positioned along the longitudinal upper edge of the rear end of the seat cushion 12. The portable arm rest 15, constructed according to an embodiment of this invention, is adapted to be rested on the seat cushion 12 and extended upwardly above the top surface of the seat cushion and engaged between the seat cushion and the seat back for positioning the arm rest at a selected position along the seat 11.

The portable arm rest 15 is formed of tubular material, preferably tubular metal, which is relatively rigid in its nature, having a certain degree of resiliency to provide for a desired amount of bending and yielding when the weight of an arm of the vehicle driver is engaged thereon.

The portable arm rest 15 is formed of a pair of side frame members 16 and 17 which are U-shaped in configuration. The U-shaped frame members 16 and 17 are formed in an identical manner, so that a detailed description of one will apply suitably to the other.

The U-shaped frame member 16 is formed with a short, upper arm or frame member 18 which is adapted to be supported in a horizontal position in the vehicle. A lower arm 19 is positioned below the upper member 18 substantially parallel thereto, and the upper and lower members 18 and 19 are secured together at one end thereof by a bight member 20 which is fixed therebetween. The bight members 20 on each of the frame members 16 and 17 are formed integrally therewith, and both of the U-shaped frame members 16 and 17 are preferably formed as a part of a single length of tubing bent to the described configuration.

The free ends of the two upper frame portions 18 are secured together by an arcuate bight member 21, and the two free ends of the lower frame portions 19 are secured together by a transverse connecting member or bight portion 22, clearly noted in Figure 3 of the drawings.

The lower frame members 19 of the frames 15 and 16 are of a length substantially greater than the length of the upper frame members 18, and extend rearwardly a considerable distance therebeyond for engagement below the back of the seat 11 on which the portable arm rest is adapted to be mounted. The engagement of the rear portions of the lower frame members 19 provide for the proper positioning of the portable arm rest in its selected position along the length of the seat 12 and its engagement under the back 14 will provide for the stabilization of the arm rest when the arm of an operator is engaged thereon.

A bracing member 24 is connected between the upper frame members 18, transversely thereof, at the forward ends thereof, to provide a substantial rectangular upper frame as the portable arm rest.

A sleeve type of web formed of flexible fabric or plastic-coated fabric or the like 25 is adapted to be slidably engaged over the frame defined by the upper frame portions 18, the bight 21 and the transverse brace 24. The sleeve 25 is tubular in configuration and open at one end thereof so that the open end of the sleeve member 25 may be slidably engaged on the frame members 18 along the length thereof, and the forward, open end of the tubular, flexible member 25 is adapted to be sealingly closed by a thong, strap, or other suitable closing means 26 engaged between the upper and lower stretches of the fabric for holding the web against sliding on the frames 15 and 16 when the arm of an operator is engaged thereon.

In the use and operation of the portable arm rest 10 described above, with the web 25 engaged in place and secured by the straps or strands 26, the rear ends of the frame members 19 are adapted to be engaged under the back portion of the seat 11 in the position desired by the operator of the vehicle so that the operator may rest his elbow and right arm thereon while driving the vehicle. The rest 15 may be slidably moved along the length of the seat cushion 12 to the desired position, and may be extended inwardly or outwardly on the seat 12 with the portion of the frame underlying the seat back in its selected position.

I do not mean to confine myself to the exact details of construction herein disclosed, but claim all variations falling within the purview of the appended claims.

I claim:

1. A portable arm rest for a vehicle having a seat cushion and a seat back mounted at the rear end of the seat cushion comprising a pair of U-shaped frame members, a horzontally extending upper member on each of said frame members, a horizontally extending lower member on each of said frame members engageable at one end between the seat cushion and seat back, and connecting members between the ends of each of said upper members.

2. A leatherette-covered portable arm rest for a vehicle having a seat cushion and a seat back mounted at the rear end of the seat cushion comprising a pair of U-shaped frame members, a horizontally extending upper member on each of said frame members, a horizontally extending lower member on each of said frame members engageable at one end between the sets cushion and seat back, a vertically extending bight member on each of said frame members between the respective upper and lower members, and connecting members between the ends of each of said upper members.

3. A portable arm rest for a vehicle having a seat cushion and a seat back mounted at the rear end of the seat cushion comprising a pair of U-shaped frame members, a horizontally extending upper member on each of said frame members, a horizontally extending lower member on each of said frame members engageable at one end between the seat cushion and seat back, a vertically extending bight member on each of said frame members between the respective upper and lower members, connecting members between the ends of each of said upper members, a tubular fabric sleeve open at one end engageable over said upper members, and means for closing the open end of said sleeve.

NORMAN G. SCHUESSLER.

REFERENCES CITED

The following references are of record in the file of this patent:

UNITED STATES PATENTS

| Number | Name | Date |
| --- | --- | --- |
| 1,890,102 | Urquhart | Dec. 6, 1932 |
| 2,505,463 | Crane | Apr. 25, 1950 |
| 2,524,659 | Gorman | Oct. 3, 1950 |
| 2,524,909 | Hines | Oct. 10, 1950 |